(12) United States Patent
Malki

(10) Patent No.: US 10,863,738 B2
(45) Date of Patent: Dec. 15, 2020

(54) PROTECTIVE COATING FOR USE ON PLANT FOLIAGE, BRANCH AND TRUNK RELATED APPLICATION

(71) Applicant: Charles Jack Malki, Los Angeles, CA (US)

(72) Inventor: Charles Jack Malki, Los Angeles, CA (US)

( * ) Notice: Subject to any disclaimer, the term of this patent is extended or adjusted under 35 U.S.C. 154(b) by 0 days.

(21) Appl. No.: 16/025,197

(22) Filed: Jul. 2, 2018

(65) Prior Publication Data

US 2018/0303084 A1  Oct. 25, 2018

Related U.S. Application Data

(63) Continuation-in-part of application No. 15/380,918, filed on Dec. 15, 2016, now abandoned.

(51) Int. Cl.

| | |
|---|---|
| *A01N 65/00* | (2009.01) |
| *A01N 3/00* | (2006.01) |
| *A01N 25/04* | (2006.01) |
| *A01N 25/24* | (2006.01) |
| *A01M 29/12* | (2011.01) |
| *A01N 61/02* | (2006.01) |
| *A01N 65/42* | (2009.01) |
| *A01N 65/20* | (2009.01) |
| *A01N 65/06* | (2009.01) |
| *A01N 65/24* | (2009.01) |
| *A01N 65/26* | (2009.01) |
| *A01N 65/22* | (2009.01) |

(52) U.S. Cl.
CPC ............ *A01N 3/00* (2013.01); *A01M 29/12* (2013.01); *A01N 25/04* (2013.01); *A01N 25/24* (2013.01); *A01N 61/02* (2013.01); *A01N 65/00* (2013.01); *A01N 65/06* (2013.01); *A01N 65/20* (2013.01); *A01N 65/22* (2013.01); *A01N 65/24* (2013.01); *A01N 65/26* (2013.01); *A01N 65/42* (2013.01); *A01M 2200/01* (2013.01)

(58) Field of Classification Search
None
See application file for complete search history.

(56) References Cited

U.S. PATENT DOCUMENTS

| | | | |
|---|---|---|---|
| 2006/0263326 A1* | 11/2006 | Weiser | A01N 1/00 424/74 |
| 2017/0112138 A1* | 4/2017 | Messina | A01N 25/00 |
| 2017/0245493 A1* | 8/2017 | Gezundhait | A01N 25/28 |

* cited by examiner

*Primary Examiner* — Ralph J Gitomer
(74) *Attorney, Agent, or Firm* — James A. Italia; Italia IP

(57) ABSTRACT

A protective coating for applying to a plant's foliage, branches and trunk for protecting against environmental stresses is formulated by combining a paint powder with at least one insect repellant oil and at least one rodent repellant oil in a water as a diluent. The paint base protects the plant against abiotic stresses by reflecting sun rays, mitigating damage caused by summer sunburn and winter sunscald, and retaining heat. The insect repellant oil and rodent repellant oil protect the plant against biotic stresses. The protective coating once assembled in an aqueous medium, is applied to the plant. The paint powder, when activated with water, has been specifically formulated to encapsulate the added oils and offer a gradual release of active ingredients that repels insects and rodents over several months under ideal conditions. The novel coating is united by a tacky binder material made from acid treated and methyl chloride rinsed methylcellulose. Reapplication of product may be needed sooner if exposed to excessive sunlight, heat and rainfall.

7 Claims, No Drawings

PROTECTIVE COATING FOR USE ON PLANT FOLIAGE, BRANCH AND TRUNK RELATED APPLICATION

CROSS-REFERENCE TO RELATED APPLICATION

This application is a Continuation-in-Part of application Ser. No. 15/380,918 filed Dec. 15, 2016, which claimed priority to U.S. Provisional Patent Application Ser. No. 62/271,958 filed on Dec. 28, 2015, the entire contents of each is incorporated by this reference.

BACKGROUND

The embodiments herein relate generally to a protective coating for applying to plants' foliage, branch and trunk to protect the plant against environmental stresses.

Outdoor trees and plants are subject to various environmental stresses such as biotic and abiotic stresses that can damage plant. The abiotic stresses, such as sudden change in temperature, extreme wind and sun rays, can cause damage to the plant's leaves, branches and trunk. Further, the biotic stresses, such as microbes, insects and rodents, can also damage the plant by causing infection, boring and girdling, respectively. These environmental stresses can be detrimental, shortening the life of the plant and may lead to the death of the plant, affecting the expected growth and yield. The protective coating disclosed in this application provides protection against abiotic stresses as well as biotic stresses.

Prior to this invention, the protective coating comprised toxic chemicals, including preservatives, fungicides and algaecides that can harm the plants and may also harm a user. Further, these coatings do not provide protection against both biotic and abiotic stresses. Finally, the toxic protective coatings are not environmentally safe and are not organic.

As such, there is a need in the industry for a protective coating for use on leaves, tree trunks and branches that overcomes the limitations of the prior art, which safely and effectively protects trees or plants from environmental stresses.

SUMMARY

A protective coating for applying to a plant's foliage, branch and trunk for protection against environmental stresses is formulated by combining a paint powder with at least one insect repellant oil and at least one rodent repellant oil in a water as a diluent. The paint base protects the plant against abiotic stresses caused by the sun by reflecting excess sun rays to mitigate risks of sunburn on hot summer days and sunscald in the winter. Further, the insect repellant oil and rodent repellant oil protect the plant against biotic stresses, such as insects and rodents. The protective coating is held in homogeneous suspension by including a tacky binder made from acid treated and methyl chloride rinsed methylcellulose. The protective coating once assembled in an aqueous medium, can be applied to the plant's foliage, branches and trunk using an applicator, such as a brush, spray and paste.

DETAILED DESCRIPTION OF CERTAIN EMBODIMENTS

By way of example, one embodiment of the present system comprises a paint powder that is mixed with a mixture of insect- and rodent-repellant diluted with a water to achieve a final concentration. A protective coating formed by mixing the paint powder, the oils and the water, is then applied to one of the set consisting of the plant's foliage, branches, trunk, and more than one of the foliage, branches or truck of a plant such as a fruit tree using an applicator.

The paint powder, when activated with water, has been specifically formulated to encapsulate the added oils and offer a gradual release of active ingredients that repels insects and rodents over several months under ideal conditions. Reapplication of product may be needed sooner if exposed to excessive sunlight, heat and rainfall.

The ingredients in the protective coating provide protection against environmental stresses. For example, the paint powder reflects sun rays that in turn protects the plant against sunburn during hot days while by retaining heat within the plant, said paint provides protection against sunscald. The paint powder in various colors, such as white, brown, and green can be used. Further, the oils in the protective coating provide protection against biotic stresses. For example, castor oil is a natural rodent-repellant by being unpalatable in taste. The protective coating formulation comprising the paint powder (89-91%), one or more members of a group of insect repellant oils (4-6%), a rodent repellant oil (4-6%) diluted in water for application. The insect-repellant oils consisting of cinnamon leaf oil, clove stem oil, garlic oil, peppermint oil, rosemary oil, cedar wood oil and neem oil with each oil having effective concentrations between 0.5 and 0.7% v/v in the final concentration. One or more oils can be combined for imparting insect repellant properties to the protective coating. The most effective rodent repellant oil is castor oil but other oils with similar properties may be also be used.

| Ingredient | Source | Mode of action | Final concentration |
|---|---|---|---|
| Methyl cellulose Paint powder | Prepared from botanic cell walls | Envelops other ingredients Protection against abiotic stresses by reflecting sun rays, retaining heat | 91% |
| Cinnamon leaf oil | Cinnamomum zeylanicum (Eugenol between 73-82%) | Insect repellant since Eugenol interferes with sensory system | 0.7% |
| Clove stem oil | Euginia cariophyllata (Eugenol 75.01%) | Insect repellant since Eugenol interferes with sensory system | 0.7% |
| Garlic oil | Allium sativum | Insect repellant and insecticide due to Sulphur compounds | 0.5% |
| Peppermint oil | Mentha piperita (Menthol between 30-35%) | Pulegone acts as insecticide | 0.7% |
| Rosemary oil | Rosmarinus officinalis | Insect-repellant and insecticide | 0.7% |
| Neem oil | Azadirachta indica | Azadirachtin repels and kills insects | 0.7% |
| Cedar wood oil | Cedrus atlantica | Insect repellent, anti-bacterial and anti-fungal | 0.7% |
| Castor oil | Ricinus communis | Rodent repellant, unpalatable to rodents | 5% |
| Water | Diluent | To achieve final concentration and consistency for application | |

Paint powder is a term encompassing inert ingredients such as pigments such as iron oxide, 0-10 percent by weight, limestone, 5-50 percent by weight, mica, 5-50 percent by weight, milk proteins, 2-10 percent by weight, and silica, 5-50 percent by weight. Other ingredients as used for example in tree protective products of IV Organics Corporation of Mission Viejo, Calif. may be included.

Methyl cellulose, also known as modified vegetable gum, is prepared by treating (acid washing) plant cell walls (cellulose), then treating (rinsing) with methyl chloride. The result is water soluble tacky synthetic binder material uniting the paint powder, the insect repellant oil, and the rodent repellant oil in a homogeneous viscous dispensable medium. The resulting composition extends the effective life of the treatment, imparting a time release effect as exposed layers weather and are lost. Treatments are effective for months or for up to a year, as opposed to days or weeks without the methylcellulose binder.

Water diluents is added in quantities at the discretion of the user. Anticipated quantities enable the resulting composition to be usable as a spray applied composition, a brush applied composition, or as a thick paste which may be applied by a spatula, trowel, or the like.

One formulation of the protective coating, when the desired application is by use of a brush, consists of 100 g of organic paint powder which is then combined with a mixture of the insect repellant oils (1.1 ml each of cedar wood oil, peppermint oil, rosemary oil, cinnamon oil and clove oil, and 0.59 ml of garlic oil) and 5.9 ml of castor oil. The water is then added to make 473.2 ml of the brush-on protective coating. The source of the oils is also organic. This formulation is also effective in repelling many types of ground rodents from consuming plant bulbs, such as but not limited to tulips, onions and potatoes, coated with the product prior to planting.

A second formulation of the protective coating, when the desired application is by use of a spray, that is dilute enough to safely coat most varieties of plant foliage, in addition to the plants trunk and branches, consists of 100 g of organic paint powder which is then combined with a mixture of the insect repellant oils (1.1 ml each of cedar wood oil, peppermint oil, rosemary oil, cinnamon oil and clove oil, and 0.59 ml of garlic oil) and 5.9 ml of castor oil. The water is then added to make 16 liters of the spray-on protective coating. The source of the oils is also organic.

A third formulation of the protective coating, when the desired application is as a tree paste to coat, consists of 100 g of organic paint powder which is then combined with a mixture of the insect repellant oils (1.1 ml each of cedar wood oil, peppermint oil, rosemary oil, cinnamon oil and clove oil, and 0.59 ml of garlic oil) and 5.9 ml of castor oil. The water is then added to make 219 ml of the paste protective coating. The source of the oils is also organic.

A fourth formulation of the protective coating, when the desired application is by use of a spray, that is dilute enough to safely coat most varieties of plant foliage, in addition to the plants trunk and branches, consists of 100 g of organic paint powder which is then combined with a mixture of the insect repellant oils (1.1 ml each of cedar wood oil, peppermint oil, rosemary oil, cinnamon oil and clove oil, and 0.59 ml of garlic oil) and 5.9 ml of castor oil. 5 ml of at least one antibiotic selected from the group consisting of streptomycin, oxytetracycline, and both streptomycin and oxytetracycline. The water is then added to make 16 liters of the spray-on protective coating. The source of the oils is also organic.

It shall be appreciated that the user may apply the protective coating using an applicator such as a brush and a spray, either partially or completely over the tree's trunk and/or branches depending on the situation. For example, avocados and citrus trees are very susceptible to sunburn and all portions exposed to the sun including the trunk and branches should be coated with the protective coating. However, if the goal is for protection from solely rodents, then the application of the product should be limited to only the first 1-2 feet of the tree trunk from the ground. However, if the goal is to prevent insects that may invade the tree trunk, then coverage for the entire tree trunk and branches may be required for protection. Pruned and damaged areas on the plant are especially prone to biotic and abiotic stresses, and can greatly benefit from protection. Additionally, newly installed plants and trees are more susceptible to biotic and abiotic stresses than established trees; and protection with this product can alleviate typical heat stress, insect and disease stresses, among other factors that can compromise the health, and possible life, of a newly installed plant until it becomes established in its new environment.

It shall be appreciated that the components of the protective coating described in several embodiments herein may comprise any alternative known materials in the field and be of any color, size and/or dimensions. It shall be appreciated that the components of the protective coating described herein may be manufactured and assembled using any known techniques in the field.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A protective coating, that is formulated for application to a plant's foliage, branch and trunk for protection against environmental stresses, the protective coating formulation in an aqueous medium comprising:
   a paint powder protecting against abiotic stresses by reflecting sun rays and retaining heat, wherein the paint powder comprises pigment, limestone, mica, milk proteins, and silica;
   at least one of an insect repellant oil protecting against insects;
   at least one of a rodent repellant oil protecting against rodents, and
   a water soluble tacky synthetic binder material uniting the paint powder, the insect repellant oil, and the rodent repellant oil in a homogeneous viscous dispensible medium,
   wherein the paint powder is combined with at least one of the insect repellant oil and at least one of the rodent repellant oil, then diluted with water for application on the plant using an applicator.

2. The protective coating of claim 1, wherein the insect repellant oil is selected from the group consisting of cinnamon leaf oil, clove stem oil, garlic oil, peppermint oil, rosemary oil, cedar wood oil and neem oil.

3. The protective coating of claim 1, wherein the rodent repellant oil is castor oil, having effective concentration between 4% and 6% v/v of a final concentration of the protective coating formulation.

4. The protective coating of claim 1, wherein the paint powder comprises between 89 and 91% w/v of a final concentration of the protective coating formulation.

5. The protective coating of claim 1, wherein the insect repellant oil has an effective concentration between 0.5 and 0.7% in final volume.

6. The protective coating of claim 1, wherein the protective coating formulation comprising:
   a. 91% by weight paint powder;
   b. 4% by volume insect repellant oils, further comprising 0.7% each of cinnamon oil, clove oil, cedar wood oil, peppermint oil, rosemary oil and 0.5% of garlic oil; and
   c. 5% by volume castor oil.

7. The protective coating of claim 1, wherein the water soluble tacky synthetic binder material comprises methylcellulose treated with an acid and then treated with methyl chloride.

* * * * *